(12) United States Patent
Wuerth et al.

(10) Patent No.: US 8,651,586 B2
(45) Date of Patent: Feb. 18, 2014

(54) BRAKING DEVICE FOR A MOTOR VEHICLE

(75) Inventors: Gebhard Wuerth, Sulzbach-Laufen (DE); Volker Mehl, Weingarten (DE); Michael Kunz, Steinheim An Der Murr (DE); Matthias Leiblein, Gerlingen (DE); Werner Quirant, Beilstein (DE)

(73) Assignee: Robert Bosch GmbH, Stuttgart (DE)

( * ) Notice: Subject to any disclaimer, the term of this patent is extended or adjusted under 35 U.S.C. 154(b) by 419 days.

(21) Appl. No.: 12/991,374

(22) PCT Filed: May 25, 2009

(86) PCT No.: PCT/EP2009/056304
§ 371 (c)(1),
(2), (4) Date: Nov. 5, 2010

(87) PCT Pub. No.: WO2009/150032
PCT Pub. Date: Dec. 17, 2009

(65) Prior Publication Data
US 2011/0049973 A1 Mar. 3, 2011

(30) Foreign Application Priority Data

Sep. 2, 2008 (DE) .................. 10-2008-041-760
Nov. 6, 2008 (DE) .................. 10-2008-002-349

(51) Int. Cl.
*B60T 13/16* (2006.01)

(52) U.S. Cl.
USPC .............................. 303/10; 303/20; 303/116.1

(58) Field of Classification Search
USPC .......... 303/10, 3, 16, 20, 113.3, 115.4, 115.5, 303/116.1, 116.2, DIG. 11
See application file for complete search history.

(56) References Cited

U.S. PATENT DOCUMENTS

| | | | |
|---|---|---|---|
| 6,733,090 B2 * | 5/2004 | Pasterkamp et al. | 303/114.1 |
| 2002/0011362 A1 * | 1/2002 | Toda | 180/65.2 |
| 2002/0101114 A1 | 8/2002 | Kamiya et al. | |

FOREIGN PATENT DOCUMENTS

| | | |
|---|---|---|
| CN | 1978237 | 6/2007 |
| DE | 197 04 248 | 8/1998 |
| DE | 101 29 594 | 1/2002 |
| DE | 10 2007 04359 | 5/2008 |
| JP | 9-2231 | 1/1997 |
| JP | 10-500083 | 1/1998 |
| JP | 2002-302031 | 10/2002 |

\* cited by examiner

*Primary Examiner* — Pamela Rodriguez
(74) *Attorney, Agent, or Firm* — Kenyon & Kenyon LLP (57) ABSTRACT

In a braking device for a motor vehicle having a first group and a second group of brake circuits, each brake circuit being associated with one group of wheels, and at least the first group of brake circuit being implemented as hydraulic brake circuits, at least one group of wheels being connected to at least one operating unit, which may cause a deceleration of the wheels, the task of a comfortable connection of recuperation brake applications to conventional brake applications is achieved in that a control unit controls the brake application of the brake circuit or circuits of the second group and optionally the deceleration effect of the operating unit or assemblies, the first group of brake circuits being activatable directly by the driver using a brake operating unit.

13 Claims, 5 Drawing Sheets

BRAKING DEVICE FOR A MOTOR VEHICLE

FIELD OF THE INVENTION

The present invention relates to the field of braking devices for motor vehicles.

BACKGROUND INFORMATION

The demands on braking devices for motor vehicles are continuously rising. Currently, requirements are no longer only placed on the performance and reliability of brakes, but rather the braking modes to be controlled, and other functions of brakes, for example, in the dynamic vehicle support, are becoming ever more complex.

Fundamentally, modern vehicles have multi-circuit brake systems, which, on the one hand, have multiple brake circuits or groups of brake circuits for redundancy, and, on the other hand, also allow brake circuits to be controlled individually, in order to distribute the brake force advisably to the brake circuits.

Within an individual brake circuit, brake governors at individual wheels may also provide varying brake force distribution to the wheels. Typical brakes on wheels of vehicles are, for example, disc brakes or drum brakes, fundamentally brakes acting on the basis of friction in any case. In addition, however, another assembly may also be used for the deceleration of wheels, such as typically an engine brake, which may be regulated in turn by appropriate settings on an internal combustion engine, or a generator. In a motor vehicle, either the typically provided small generator in the form of a dynamo comes into consideration as the corresponding generator, which is used for charging the starter battery and for supplying the electrical systems of the vehicle, or, in the case of a hybrid vehicle, a drive motor, which may be operated as a generator and may then be used for charging the drive battery, for example. Similar vehicles which are operable alternatively electrically or with the aid of an internal combustion engine are called hybrid vehicles. The action of reclaiming energy during a brake application using a generator and thus braking the vehicle is referred to by the term recuperative braking.

Fundamentally, optimizing the driving safety and brake application in a vehicle by suitable control or regulation of individual brake circuits or brakes and the employed braking arrangement is understood.

Thus, a brake pressure regulation system for a vehicle is discussed in DE 4128087 A1, using which an underbraked rear axle is prevented in the case of braking while cornering. The brake pressure on the front axle is specified by the driver, and the brake pressure on the rear axle is regulated as a function thereof.

Distributing the brake force in such a way that the strongest possible braking of the vehicle is achieved in consideration of the friction utilization is also known, wheels which are more heavily loaded statically and/or dynamically also being able to be more strongly affected by the brakes.

A system is discussed in EP 0173954 B1, in which the brake pressures for individual brakes are ascertained using a reference mass for the vehicle and the setpoint deceleration, which is specified by the driver, in a stored vehicle-specific characteristic map. The ascertained brake pressures are introduced into the brakes and readjusted as needed in the event of deviation of the vehicle deceleration from the setpoint value until the setpoint deceleration is achieved.

A brake pressure regulating unit is known from DE 3313078 A1, which ascertains and takes into account the wear of various wheel brakes, so that a more uniform wear of the individual wheel brakes is achieved in the long term.

A brake system is known from DE 102005046606, in which one brake circuit is associated with each of the axles of a vehicle, so that an anti-slip unit and a vehicle dynamics controller may be provided exclusively in one brake circuit, whereby the total design expenditure is minimized.

Finally, from DE 10316090 A1, a brake system is discussed having multiple brake circuits, which fundamentally work hydraulically and act on friction brakes of individual wheels, and having a generator or an electric drive motor, which is operable as a generator and may additionally be used for deceleration. A control unit is provided to optimize the brake force distribution to all individual wheels in consideration of various vehicle-dynamics variables.

SUMMARY OF THE INVENTION

The exemplary embodiments and/or exemplary methods of the present invention is based on the task of providing a braking device for a motor vehicle, which also supports complex braking-dynamic and vehicle-dynamic regulating actions, has the highest possible reliability, and is constructed having the simplest possible design.

The task is achieved according to the exemplary embodiments and/or exemplary methods of the present invention by a braking device according to the features described herein, by a hydraulic device according to the description herein, and by a method for operating a braking device according to the description herein.

A similar motor vehicle has a first group of brake circuits, i.e., at least one single first brake circuit, which acts on a group of wheels, is implemented in a way known per se as a hydraulic brake circuit, and may be activated directly by the driver, independently of the action of the control unit or at least only with cooperation of a control unit, using a brake operating unit. This means that, for example, the driver operates a brake pedal and may thus compress hydraulic fluid in a brake master cylinder, the appropriately elevated hydraulic pressure being fed directly into the brake circuit of the first group and causing the operation of corresponding wheel brakes therein. Regulating units may be provided within the first brake circuit on the wheel brakes, which implement an anti-locking device or ensure optimized distribution of the brake force between the individual wheels, for example, when cornering, if the wheel on the outside of the curve is dynamically loaded more heavily and may thus also be braked more strongly as a result of the stronger friction action, or in the case of a vehicle dynamics controller, for example, if the wheel on the inside of the curve is braked in addition to the steering action, in order to dynamically support the cornering movement of the vehicle. The regulating units may cooperate with the control unit or be integrated therein.

Therefore, the connection between the brake pedal and the brake application in the first group of brake circuits is very direct, which allows good handling ability and controllability by the driver and increases the reliability as a result of the independence from a control unit.

Optionally, the wheels braked using the brake circuits of the first group may be connected to one decelerating unit.

However, the wheels associated with the second group may be additionally or, advantageously exclusively, connected to decelerating units.

The second group of brake circuits, in addition to the operating possibilities directly by the driver which are provided in established operating states, for example, in the case of full braking, is also operable by the control unit, which may advantageously additionally control the deceleration of the wheels by one or more additional operating units or may cooperate with a further control unit for this purpose, which assumes this task. In this way, the so-called blending actions, i.e., the adaptation of the activation of brake circuits as a result of the change in the deceleration by additional operating units, are restricted to a part of the braking device. Similar blending actions relate to the shutdown of recuperative braking, for example, it braking is initially performed using a generator and the battery to be charged accordingly is full. It may then switch over to existing power consumers, which may mean a sudden change in the generator load, however, whereby the deceleration effect of the generator changes. This change may advantageously be compensated for accordingly by the control unit on the brake circuits of the second group.

The deceleration effect by a drive motor used as a generator is additionally a function of the driving speed, so that during stopping of the vehicle, practically in the range of lower speeds, only a very reduced deceleration effect may be achieved, which may also be advantageously compensated for by blending using the brake circuits of the second group.

Gear shifting actions, during which the traction is interrupted and/or the rotational speed in the drivetrain changes suddenly, also result in fluctuations of the deceleration effect of an electrical drive motor used as a generator, so that blending may advantageously also occur in these cases.

During all of these actions, an effect on the overall brake application may advantageously be changed in the case of suitable control of the brake circuits of the second group. Because the driver exerts a direct effect at least on the brake circuits of the first group, the brake application is not endangered and at least a part of the brake application remains completely uninfluenced by the blending. Increased driving comfort combined with high functional reliability and availability of the overall braking system thus results. The braking device thus formed is usable both for vehicles of conventional construction and also for hybrid vehicles. The control by the control unit may be conceived so that optimized braking performance and simultaneously environmentally friendly reclamation of kinetic energy may be achieved. Fuel may thus be saved and the pollutant emissions of the vehicle may be reduced.

A braking intent by the driver should be used as the input variable for the control unit to optimize the overall brake application. This command may be derived, for example, from the operation of the brake operating unit, typically a brake pedal, for example, by measuring the hydraulic pressure on the brake master cylinder or in a brake circuit of the first group or measuring the brake application of the brakes or also in the course of a brake-by-wire method, in that the intensity of the brake pedal operation is detected by appropriate distance/force or pressure sensors, for example, optically or electrically. The appropriate intensity corresponds to the total braking intensity desired by the driver. The brake application in the brake circuits of the first group may be subtracted therefrom. In addition, the known deceleration power of the corresponding operating units may be considered and the required operating intensity of the brake circuits of the second group may be ascertained therefrom.

An advantageous embodiment of the present invention provides that at least two wheels on different sides of the vehicle, viewed in the travel direction, are activatable differently by the control unit within at least one brake circuit of the second group.

Such an association of wheels with brake circuits of the second group allows asymmetrical braking in the travel direction, whereby the brake application on wheels which are dynamically pressed more strongly onto the roadway may be increased in order to optimize the overall brake application.

Alternatively, however, dynamic vehicle support may also be performed by braking wheels on the inside of the curve.

A sensor for detecting the transverse acceleration and/or a sensor for detecting a steering command and/or a sensor for detecting the travel direction are advantageously provided for this purpose.

The dynamic load of the wheels during cornering and thus an optimized brake force distribution may be calculated from the detected transverse acceleration, while the detected steering command, for example, in the form of a steering angle, allows the determination of optimized vehicle dynamics control by braking a wheel on the inside of the curve. If the travel direction is known, the distribution of the brake force on wheels situated in front in the travel direction, i.e., the rear wheels during reverse travel, may be used.

During brake operations via the brake pedal, no pedal feedback from the brake pedal occurs in the braking device because of the second brake circuits being decoupled from the brake master cylinder, even during their operation, so that irritation of the driver in such situations is prevented.

The braking device according to the present invention has a particularly simple and advantageous design if the brake circuits of the second group are each associated with the wheels of a single axle. Individual axles may thus be braked in a targeted manner.

It is advantageous in particular if the second group is formed by a brake circuit which is associated with the wheels of a rear axle.

In this case, the driver will operate the brakes of the front wheels directly using a brake pedal, while the brakes of the rear wheels are controlled decoupled from the direct braking, in particular in consideration of possibly provided operating units. It is to be ensured that the ratio of the brake applications on the directly braked wheels to the wheels braked under the control of the control unit is optimized, for example, during forward/reverse travel. In addition, a braking device of this type is usable both for vehicles of conventional construction, for example, if the corresponding operating unit is formed by a dynamo, and also for vehicles of the hybrid construction, if the operating unit is formed by an electric drive motor operated as a generator.

This applies for the case of rear wheel drive; for the case of front wheel drive, the brake circuits of the second group may also be associated with a driven front axle.

The particular generators are appropriately connected to batteries, either to a starting battery or to a vehicle drive battery, which they charge in the course of recuperative braking. The charge state of the corresponding battery is advantageously monitored, so that information that the generator load is reduced because of a full battery is available in a timely manner. In this case, an electrical consumer may advantageously be coupled to the corresponding generator, such as a heating resistor or the lighting of the vehicle. The control unit ensures the corresponding changeover actions.

In order that the blending actions may run largely unnoticed by the driver, in addition to a sensor for detecting the charge state of the battery, a speed sensor for detecting the driving speed and/or a clutch sensor for detecting an operation of the transmission clutch are advantageously provided, for example. The dropping generator output and, in the case of clutch actions, the disengagement of the operating unit may thus be registered in a timely manner at low speeds, in order to keep the brake application largely constant via regulating actions of the control unit.

A power sensor for detecting the electrical power of the generator may also be used for the described purposes, for example.

A brake circuit of the second group may also advantageously be implemented as a hydraulic brake circuit, which has a differential pressure actuator or a pressure regulator as a control element.

In this case, both the brake circuits of the second group and the brake circuits of the first group are implemented as hydraulic brake circuits, whereby corresponding synergy effects result both during manufacturing and during operation. For example, hydraulic pressure may be provided jointly for the hydraulic brake circuits or at least corresponding hydraulic pumps of the individual brake circuits may be driven jointly. The control unit may implement the intensity of the braking in the brake circuits of the second group via the activation of a differential pressure actuator or a pressure regulator. In addition, appropriate pressure gauges are provided in the brake circuits of the second group, for example, in the area of the wheel brake cylinders, for the operation of a pressure regulator.

Additionally or alternatively, a brake circuit of the second group may be implemented as a hydraulic brake circuit and may be directly hydraulically connectable to the brake operating unit.

In this case, for example, in the event of failure of the control unit or in the case of maximum braking, the brake pressure in the brake master cylinder, which is elevated by a brake pedal operation, may be directly introduced not only into the brake circuits of the first group, but rather also into at least one hydraulic brake circuit of the second group, so that even in the event of failure of the control unit, optimized braking is possible and/or in particular in case of emergency braking, the effect of the brakes of all brake circuits is immediately available as in the conventional brake system.

In addition, the hydraulic brake circuit of the second group may advantageously have a hydraulic auxiliary accumulator on the intake side of a hydraulic pump of the brake circuit in the form of a piston/cylinder system. It is advantageously implemented using a spring pre-tension, which produces a suction effect.

In the case of a hydraulic brake circuit which is decoupled from the brake master cylinder in the normal case, it may additionally prove to be necessary to provide an auxiliary accumulator, because the corresponding hydraulic pump of the brake circuit may not aspirate hydraulic fluid from the area of the brake master cylinder. An auxiliary accumulator provides a remedy here in that it may receive hydraulic fluid on the one hand, but is not connected to the primary side, i.e., the pressure side, of the corresponding brake circuit on the other hand. Rather, it is filled from the secondary side of the corresponding hydraulic pump.

The piston/cylinder system may advantageously also have a stepped piston, whose secondary-side piston, which is smaller in cross section, acts to reduce the accumulator volume and is connected to a pressure line of the brake circuit.

The hydraulic reservoir may be placed under pressure by the force action of the piston which is smaller in cross section, and a pre-load of the hydraulic pump may thus be achieved by the stepped piston, whose secondary side is connected to the high-pressure branch of the brake circuit. The spring design of the pre-tension spring in the auxiliary accumulator is thus made easier, so that the system becomes less sensitive to force changes which may occur through friction, for example. Fundamentally, a pre-load pressure is desirable on the secondary side of the hydraulic pump during operation of the brake circuit.

Because the smaller piston of the stepped piston is significantly smaller in cross section than the larger piston, the volume consumption on the high-pressure side for the pretension of the auxiliary accumulator is minimized.

Furthermore, the exemplary embodiments and/or exemplary methods of the present invention may be advantageously implemented in that the hydraulic pumps associated with the brake circuits of the first group may be mechanically decoupled from a shared pump drive, in particular by a freewheel clutch which is controllable by the rotational direction of a pump drive shaft.

Alternatively or additionally, it is also advantageously conceivable that the hydraulic pumps, which are associated with the brake circuits of the first group, are connectable via valves on the intake side to the particular high-pressure outlet and in particular are connected via spring-loaded check valves on the high-pressure side to the particular brake circuit.

In particular if the hydraulic pumps of various brake circuits of various groups are kinematically coupled, for example, in that they are driven by the same motor via a single shaft, the problem results that the corresponding hydraulic pumps are driven even when the brake circuits are not all operated.

Decoupling the corresponding hydraulic pumps in non-operated brake circuits solves this problem.

This may be performed, on the one hand, by mechanically decoupling the pump drive as described. For example, the pump drive motor, typically an electric motor, may be driven in a first direction when all hydraulic pumps are to be driven and in a second rotational direction when only one or a few of the hydraulic pumps are to be driven, a direction-sensitive freewheel being provided, which decouples the remaining hydraulic pumps, which are not to be operated, in the second rotational direction.

The problem may also be reduced by the incorporation of hydraulic valves, namely in that the primary side and the secondary side are connected to one another via throttles, for example, in the unneeded hydraulic pumps. In addition, the primary side of a potentially unneeded hydraulic pump may be connected directly or via a check valve, which may also be spring-loaded, to the brake circuit. The brake pedal, when operated, is thus hydraulically decoupled from the pump.

In a specific embodiment, the braking device includes a brake master cylinder, which is coupled to the brake operating unit so that during an operation of the brake operating unit, a pressure signal corresponding to the operation of the brake operating unit is provided, at least one brake circuit of the second group having at least one wheel brake cylinder, which is situated on an associated wheel, being coupled to the brake master cylinder in such a way that the pressure signal may be relayed from the brake master cylinder to the wheel brake cylinder, the wheel brake cylinder being designed for the purpose of exerting a force corresponding to the pressure signal on the wheel; a disconnection valve situated between the brake master cylinder and the wheel brake cylinder, which is designed to pass into a closed state upon receiving a provided closing signal and to prevent the pressure signal from being relayed to the wheel brake cylinder; and an external accumulator, which is coupled to the wheel brake cylinder in such a way that a volume for a pressure buildup in the wheel brake cylinder may be provided by the external accumulator to the wheel brake cylinder. The external accumulator is to be understood, for example, as a second accumulator, which is coupled to the brake circuit of the second group in addition to a first accumulator, which is designed to receive a volume from at least one wheel brake cylinder. Equipping the brake circuit of the second group with a second accumulator allows a clear separation between the volume of the second accumulator for the pressure buildup in the at least one wheel brake cylinder and the volume filled into the first accumulator from the at least one wheel brake cylinder. Simpler volume balancing is thus possible. In particular, this allows regulation of the pressure in the at least one wheel brake cylinder via standard pressure regulating valves.

The external accumulator may thus be implemented as a stepped piston and may have a volume reservoir for the elevated pressure in the wheel brake cylinder on a primary side. On a secondary side, the external accumulator may be coupled to a delivery side of a pump. The external accumulator and the pump may be activatable by the control unit in such a way that, if the disconnection valve is in its closed state, the pressure in the wheel brake cylinder is settable via the pump and the external accumulator. The pressure existing in the at least one wheel brake cylinder is thus no longer directly a function of the operation of the brake operating unit, but rather is correspondingly settable to a value which is advantageous with respect to a certain traffic situation.

In addition, the exemplary embodiments and/or exemplary methods of the present invention relates to a braking device and also to a method for its operation and to a hydraulic unit for a braking device of this type.

Further features and advantages of the exemplary embodiments and/or exemplary methods of the present invention are explained hereafter on the basis of the figures.

DETAILED DESCRIPTION

Figure 1:
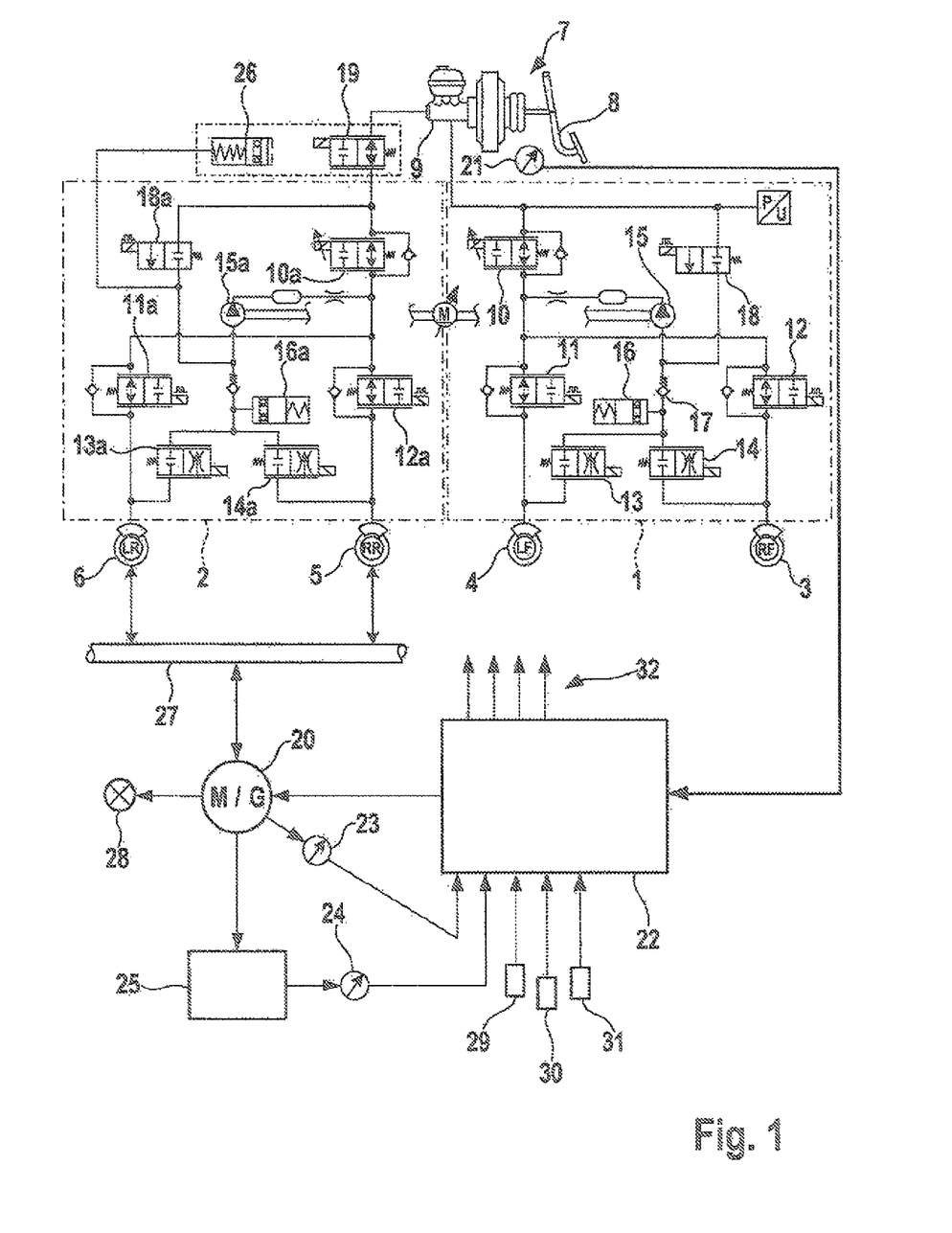
FIG. 1 shows the basic structure of the braking device having hydraulic pumps, lines, and valves in a first specific embodiment, and a control unit.

FIG. 1 shows a braking device having a first brake circuit 1 on the right side, which is associated with front wheels 3, 4 of a two-axle motor vehicle, and a second brake circuit 2, which is associated with rear wheels 5, 6 of the motor vehicle. The brake circuits are each indicated by dot-dash lines. The dot-dash lines each only designate functional boundaries and associations; the corresponding units may nonetheless be combined into shared modules, for example, into a hydraulic block.

In the concrete case in which the motor vehicle only has two brake circuits, first brake circuit 1 forms the first group of brake circuits, which are directly hydraulically operable, while the second brake circuit forms the second group of brake circuits, which are only sometimes connected to a hydraulic brake operating unit 7; however, they are typically hydraulically decoupled therefrom during active interventions and partial braking.

Hydraulic brake operating unit 7 has a brake pedal 8 and a brake master cylinder 9, in which a hydraulic pressure for operating the brake unit when brake pedal 8 is stepped on is built up, optionally employing a brake force booster.

The basic function of such a module will first be explained for exemplary purposes on the basis of first brake circuit 1.

If brake pedal 8 is operated, an elevated brake pressure arises in brake master cylinder 9. It is conducted via so-called changeover valve 10, whose further function will be explained hereafter, to pressure buildup valves 11, 12, which are associated with individual wheels 3, 4.

Pressure buildup valves 11, 12 basically distribute the elevated hydraulic pressure further to the brake cylinders of wheels 3, 4, so that the corresponding friction brakes, for example, in the form of disc brakes, are operated. When individually releasing the brakes of an individual wheel in the case where an antilock system responds, for example, pressure reduction valves 13, 14 are also used, so that the hydraulic pressure in the wheel brake cylinders drops independently of the pressure level in the high-pressure part of the corresponding brake circuit and the hydraulic fluid may be drained to the intake side of hydraulic pump 15. Hydraulic accumulator 16 is provided there to receive the hydraulic fluid. A spring-loaded check valve 17 ensures that the hydraulic pump optionally aspirates hydraulic fluid via open intake valve 18 and that no hydraulic fluid may flow to pressure accumulator 16 from the intake side of the hydraulic pump.

An antilock system is typically provided for the individual wheels, which prevents locking of the wheels in the event of excessively strong braking. For example, rotational speed sensors (not shown) are provided on wheels 4, 3 for this purpose, which output a signal to a control unit 22 in the event of locking of a wheel. Brake pressure buildup valve 11, 12, which is associated with the wheel, is then closed and associated brake pressure reduction valve 13, 14 is opened simultaneously in order to cancel out the locking of the wheel. Hydraulic pump 15 is driven simultaneously to pump hydraulic fluid under high pressure to the primary side of the brake circuit.

If the corresponding wheel rotates further, the pressure and thus the brake application may be increased again via opening of brake pressure buildup valves 11, 12, until locking threatens again. This iterative process requires hydraulic fluid under high pressure on the primary side of the brake circuit, which is delivered by the brake operating unit, optionally also by hydraulic pump 15. Hydraulic accumulator 16 ensures that a compensation volume is available for the hydraulic fluid, in particular when the wheels are individually unbraked via valves 13, 14.

The described action may also be performed in a similar form if slip threatens during starting of the vehicle at one wheel or at multiple wheels or if a wheel brake is operated for the purpose of vehicle dynamics control, without brake pressure arising in the brake master cylinder. In both cases, the required pressure for operating the wheel brake cylinder may be delivered by hydraulic pump 15. In order to be able to build up the pressure in the brake circuit independently of the lack of operation of the brake pedal, the brake master cylinder is decoupled from the brake cylinder in this case by closing changeover valve 10.

So-called intake valve 18 is opened simultaneously, so that hydraulic fluid may reach the intake side of hydraulic pump 15 from the area of the brake master cylinder. Control unit 22 may take over the control of the above-mentioned valves. Like brake pressure buildup valves 11, 12, brake pressure reduction valves 13, 14 may also be controlled. If necessary, a pressure reduction may thus be achieved very rapidly at individual wheels, in order to prevent a wheel from locking.

The function of second brake circuit 2 on the left side of FIG. 1 is fundamentally comparable to that of first brake circuit 1, with the exception that second brake circuit 2 may be completely decoupled by disconnection valve 19 from brake master cylinder 9, in particular during partial braking. Disconnection valve 19 also does not have, in contrast to valves 10, 10a, a one-way bypass valve, which would allow braking from the brake pedal in the second brake circuit in the closed position of disconnection valve 19.

Three fundamental states are to be differentiated in the description of the mode of operation of the second brake circuit:

1. During unbraked running of the motor vehicle, a wheel brake 5, 6 is not operated, nor is an operating unit 20, for example, in the form of an electric drive motor operated as a generator, used for deceleration.
2. In the case of partial braking, recuperative braking may occur, i.e., a known braking torque acts through operating unit 20 on wheels 5, 6. The deceleration command, which is expressed by the driver by operating brake pedal 8, may be recorded using a sensor 21 or be estimated using other detected parameters and relayed to control unit 22. This is known as the deceleration torque of operating unit 20 or it is measured and transmitted using a power sensor 23. Alternatively or additionally, the charge state of a battery 25, which is charged by the operating unit, may also be detected using a charge sensor 24 and provided to control unit 22, in order to establish the load state of operating unit 20.

In consideration of the braking intent, the actual deceleration effect achieved by first brake circuit 1 in a hydraulic manner, and the known deceleration torque of operating unit 20, control unit 22 calculates the brake deceleration to be achieved by the second brake circuit and sets it primarily by activating changeover valve 10a, which operates as the pressure differential control valve. This is possible by modulating changeover valve 10a. In addition, the pump is activated. The pump aspirates hydraulic fluid from accumulator 26 and delivers it via valves 11a, 12a to the brakes of wheels 5, 6. If the wheels are to be unbraked during this control process, hydraulic fluid passes valves 11a, 12a, 10a and is conveyed back through valve 18a into accumulator 26 if necessary.

Pressure may be reduced on individual wheels via valves 13a, 14a, similarly to the function of valves 13, 14 in the first brake circuit.

In most cases, auxiliary accumulator 26 basically delivers the hydraulic fluid required for the operation of the brake circuits of the second group. It is also refilled in each case during the regular brake release actions. If the brake circuits of the second group are temporarily not in operation, intake valve 18a may also be opened in order to fill accumulator 26.

After ending a braking action, auxiliary accumulator 26, which essentially includes a piston/cylinder system, aspirates hydraulic fluid, in particular if it is spring-loaded by a spring pre-tension of the piston.

The spring strength and thus the pre-tension of the piston, if present, are to be selected suitably, so as not to reduce the hydraulic pressure on the intake side of hydraulic pump 15a so much that the pump may no longer aspirate fluid. On the other hand, the pre-tension of the auxiliary accumulator must be sufficiently large to refill it in an acceptable time during non-operation of brake circuit 2, in particular in the case of an open intake valve.

The possibility of operating the second brake circuit using hydraulic fluid from the auxiliary accumulator is thus ensured as much as possible.

The extent of the operation of second brake circuit 2 is fundamentally reduced to wheels 5, 6 by the additional deceleration effect of operating unit 20 via a drive shaft 27 and energy is correspondingly reclaimed via the operating unit and stored in battery 25, for example.

In the cases in which the deceleration torque of operating unit 20 varies, for example, if battery 25 is full, the vehicle slows down, or the drivetrain is decoupled from the wheels by a gear shifting action and thus the traction in the drivetrain is interrupted, in order to keep the total deceleration constant, the deceleration torque of the operating unit must either, as much as possible, be appropriately increased by control unit 22, for example, by switching in an electrical consumer 28, and/or the activation of second brake circuit 2 must be changed in such a way that the changed brake force compensates for the changed deceleration torque of operating unit 20.

This is possible to accomplish significantly more simply than in typical braking devices by using the braking device according to the present invention, because, on the one hand, through the direct operation of the first brake circuit, the brake application achieved therein remains constant and is well controllable by the driver and, on the other hand, the equalization of brake applications by control unit 22 between both independent partial braking devices 2, 20 is to be implemented relatively readily, smoothly, and largely unnoticed by the driver.

3. During full braking, disconnection valve 19, which remains closed during partial brake applications, may remain open, so that the high brake pressure produced in brake master cylinder 9 may be conducted through disconnection valve 19, changeover valve 10a, and brake pressure buildup valves 11a, 12a to the brake cylinders of wheels 5, 6. In this manner, an optimum immediate brake application having a corresponding braking feel at brake pedal 8 is produced. Minimal lengthening of the pedal travel occurs, which is tolerable in case of emergency braking, however.

In addition, sensors 29 (transverse acceleration sensor), 30 (slip sensor), and 31 (driving speed sensor) are shown in the area of control unit 22 in FIG. 1. Moreover, a travel direction sensor may be provided, which helps control unit 22 to differentiate between forward travel and reverse travel, so that the brakes of the rear axle may be loaded more strongly during reverse travel.

In addition, control unit 22 may be connected to speed sensors on wheels 5, 6, and to a sensor which indicates the operation of a transmission clutch.

Corresponding outputs 32 are connected to controllable valves 10a, 11a, 12a, and to optionally controllable valves 14a, 13a. Fundamentally, all controllable valves are connected to a control unit in order to allow adapted activation.

Figure 2:
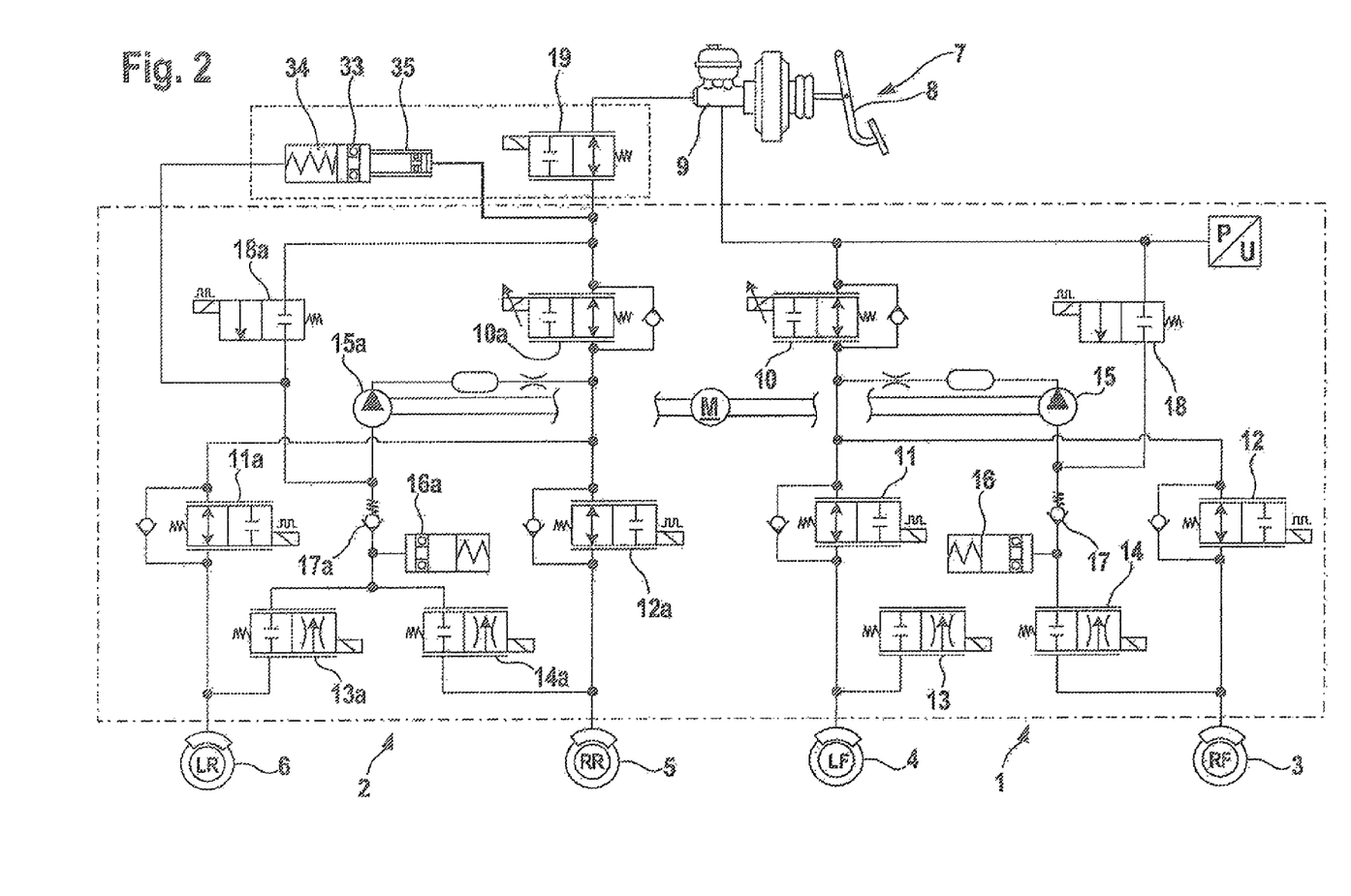
FIG. 2 shows a braking device according to the present invention in a second specific embodiment.

FIG. 2 shows a braking device which is shown similarly to that in FIG. 1. Identical parts are provided with identical reference numerals.

The structure and mode of operation of control unit 22 are omitted in FIG. 2 for the sake of clarity. However, they are fundamentally comparable to that shown in FIG. 1.

The braking device shown in FIG. 2 differs from the braking device shown in FIG. 1 essentially in that instead of an auxiliary accumulator 26 in the form of a piston/cylinder system, an expanded stepped piston assembly 33 is provided. It has a differential piston, which delimits an accumulator volume 34 having a large cross section on its primary side, and the stepped piston forms a smaller piston 35 of a smaller cross section on the secondary side, which is connected to the high-pressure side of the brake circuit. In operation, i.e., in the pressure-loaded state, the pressure acting on small piston 35 on the secondary side supports the emptying of the pressure accumulator and thus eases the suction effect of hydraulic pump 15a. In the suction phase, i.e., typically when the brake circuit is unpressurized, the suction effect is further essentially given by the pre-tension spring. In this manner, the mobility of the stepped piston is ensured in both directions and independently of the spring design or possibly occurring irregular friction forces.

Fundamentally, the piston which is smaller in cross section and the larger piston may also be implemented separately. Pressure forces may thus still be transmitted, but the pistons remain movable independently of one another.

Figure 3:
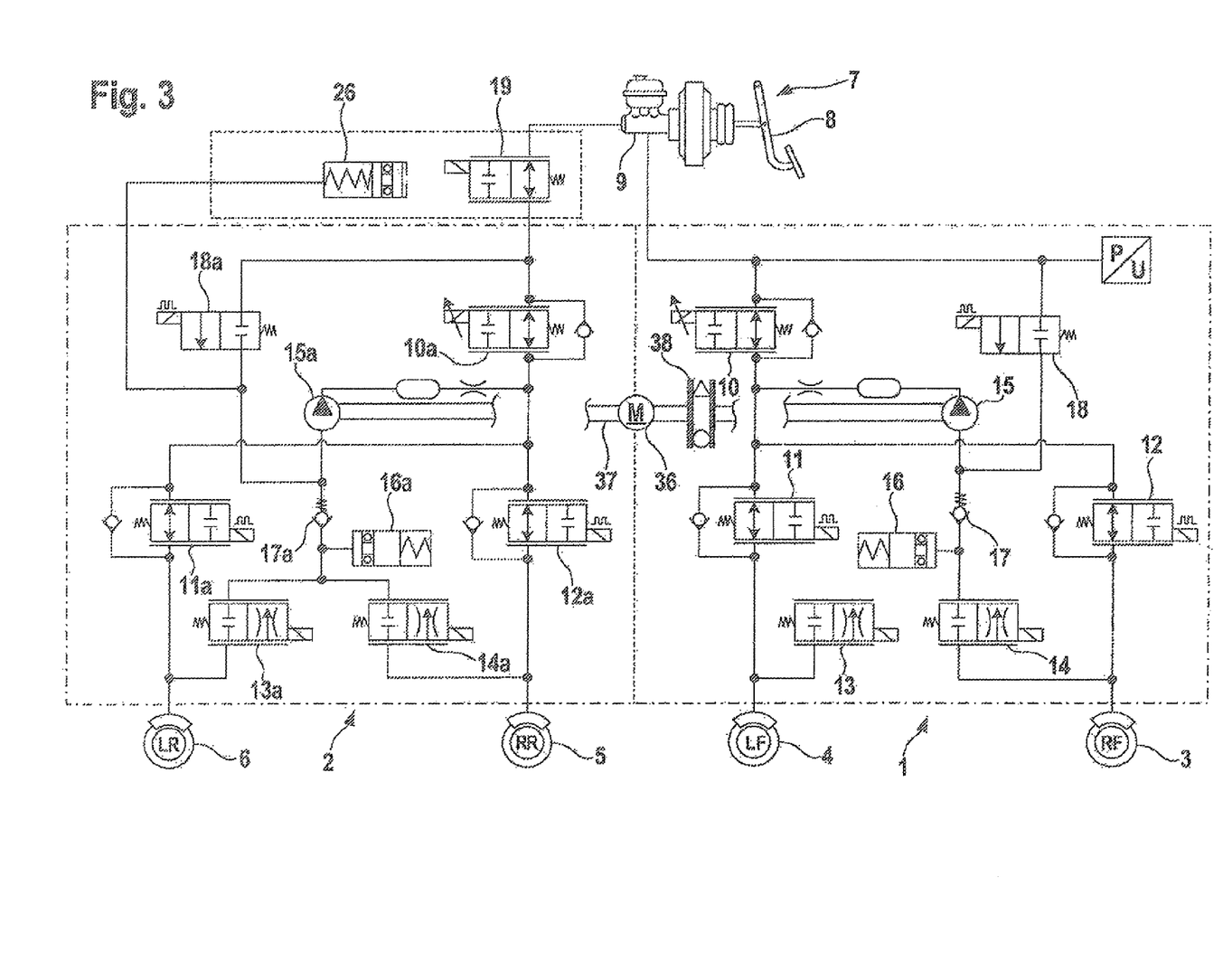
FIG. 3 shows a braking device according to the present invention having a first decoupling unit for the various brake circuits.

A braking device is shown in FIG. 3, which corresponds in large parts to that shown in FIG. 1. However, a unit is shown therein which increases the comfort in that a particular unneeded hydraulic pump 15 is decoupled from the drivetrain of pump drive motor 36 when it is not required. This occurs in that drive motor 36 may fundamentally drive corresponding drive shaft 37 in both rotational directions, and hydraulic pump 15a of the second brake circuit may produce a hydraulic pressure independently of the rotational direction of shaft 37. A mechanical freewheel unit 38 is formed on shaft 37 between drive motor 36 and hydraulic pump 15, which ensures that hydraulic pump 15 of the first brake circuit is only driven in one rotational direction of shaft 37, but not in the opposing running direction. This prevents pulsations due to pump operation being perceptible in a brake circuit of the front axle during partial braking, for example, when the hydraulic pump builds up pressure in a brake circuit of the second group (i.e., on the rear axle in the present example).

Figure 4:
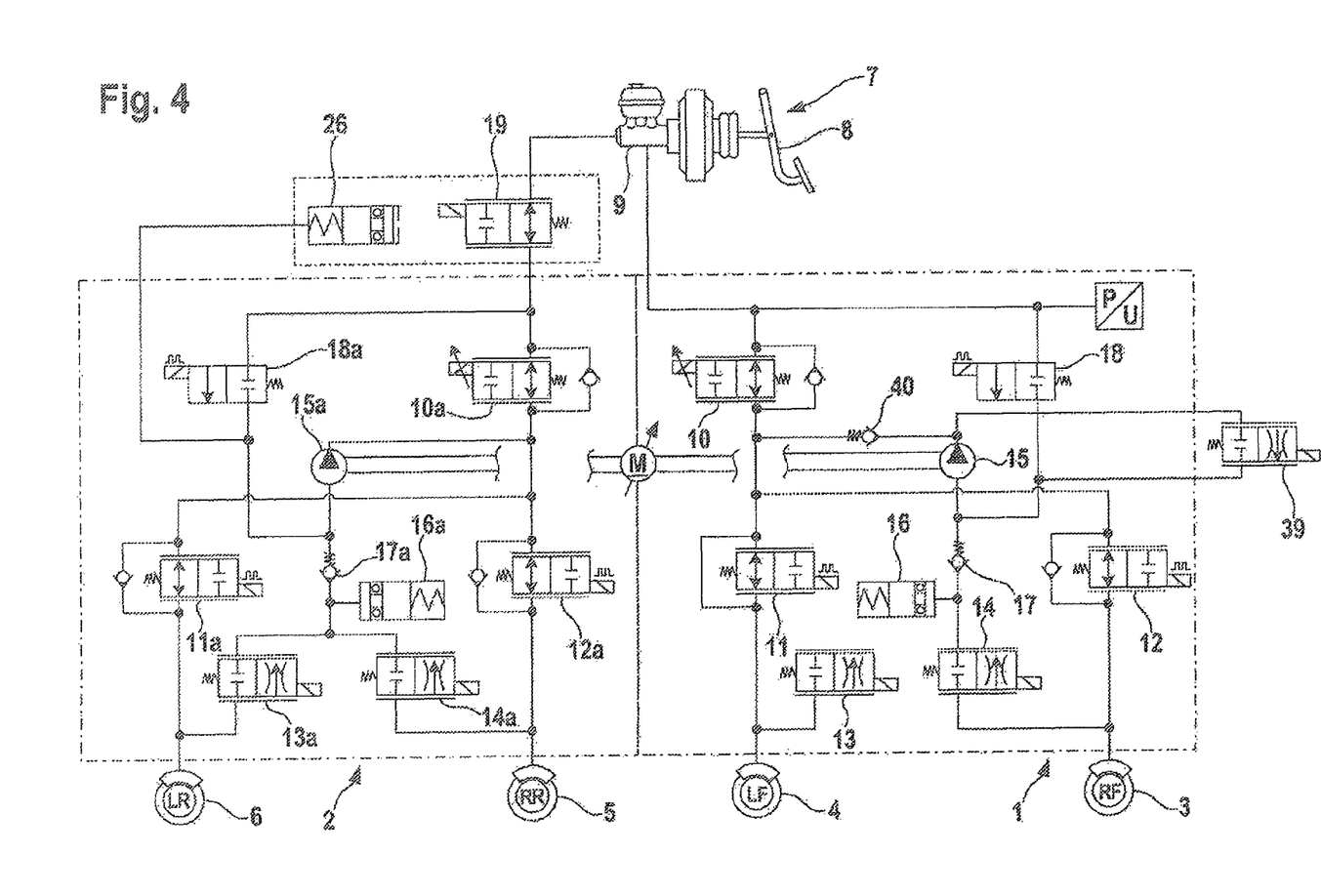
FIG. 4 shows a view of a braking device having a second decoupling unit for various brake circuits.

A braking device similar to that shown in FIG. 3 is represented in FIG. 4, the task of decoupling of the hydraulic pressure production of first brake circuit 1 from the hydraulic pressure production in second brake circuit 2 being achieved not by a mechanical freewheel of the drive shaft of the hydraulic pumps, but rather in that hydraulic pump 15 of first brake circuit 1 does operate simultaneously with hydraulic pump 15a of second brake circuit 2, but in the case of decoupling, the output side of the same hydraulic pump 15 is connected via a changeover valve 39, which is open in this case, to the intake side of hydraulic pump 15, so that the pump conveys hydraulic fluid in the circuit. Idling of hydraulic pump 15 is thus ensured, so that pulsations are prevented.

Hydraulic pump 15 is connected via what may be a spring-loaded check valve 40 to the high-pressure side of first brake circuit 1, in order, on the one hand, to allow the conveyance of hydraulic fluid by pump 15 into the high-pressure part of the first brake circuit, but, on the other hand, to prevent "braking" by the brake pedal via valve 10, hydraulic pump 15, and valve 39 in the low-pressure part, in the area of the outlet of the wheel brake cylinder, because this could interfere with a pressure control.

The braking device according to the present invention thus allows comfortable usage of recuperative brake applications, it being possible to absorb and equalize fluctuations within a subsystem of the braking device, which thus remain unnoticed to the driver or the occupants of the vehicle. In addition, a further subsystem of the braking device is provided, which remains uninfluenced by the equalization actions and functions conventionally. A competent control unit controls all occurring braking and deceleration effects in a suitable manner.

Figure 5:
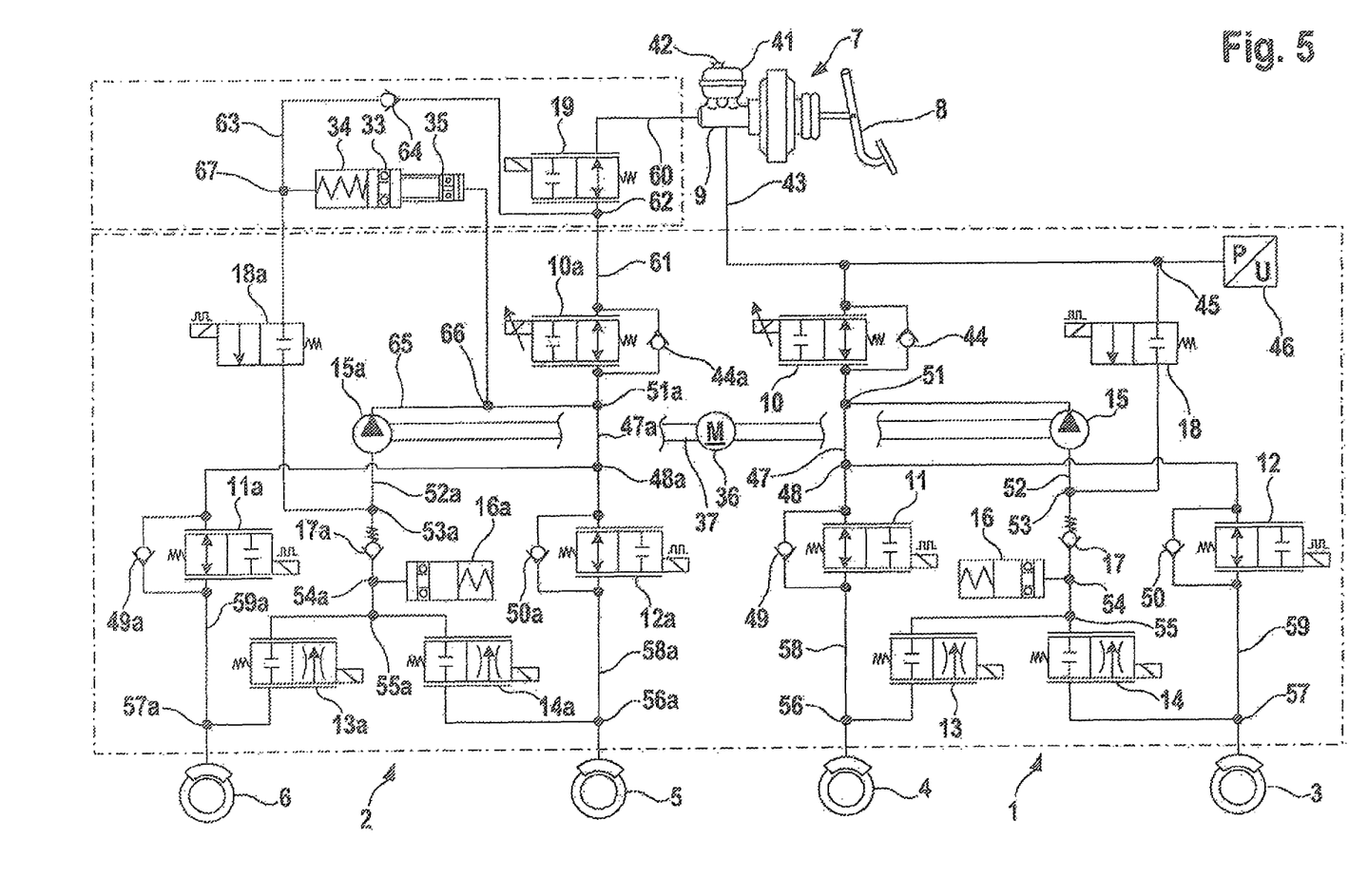
FIG. 5 shows a braking device according to the present invention in a third specific embodiment.

FIG. 5 shows a braking device according to the present invention in a third specific embodiment.

The braking device described in the following paragraphs is not only usable in a hybrid vehicle. Instead, the braking device may also be used in conventional vehicles, in order to ensure a particular brake force distribution to the wheels of the vehicle in the case of braking during cornering and/or reverse travel, for example.

The braking device shown includes a first brake 1 for braking front wheels 3 and 4 and a second brake circuit 2 for braking rear wheels 5 and 6. Of course, a specific embodiment is also possible in the case of the braking device, in which wheels 5 and 6 are rear wheels and wheels 3 and 4 are front wheels of a vehicle. Wheels 3 and 4 and wheels 5 and 6 may also be two pairs of wheels 3 through 6, which are situated on two different sides of a vehicle or diagonally on a vehicle. Furthermore, the braking device shown is not restricted to the fixed number of four wheels 3 through 6. The braking device may be expanded in such a way that more than four wheels may be braked. For example, the braking device has at least two brake circuits corresponding to first brake circuit 1 in this case.

A hydraulic brake operating unit 7 of the braking device has, as already described above, a brake pedal 8 and a brake master cylinder 9. Furthermore, hydraulic brake operating unit 7 may include a brake force booster. In addition, a pedal travel sensor, a booster diaphragm travel sensor, and/or a rod travel sensor may be attached to brake pedal 8. As an alternative or supplement to brake pedal 8, the braking device may also have another brake input element for detecting a braking intent of a driver.

As shown in FIG. 5, a brake fluid reservoir 41, for example, a hydraulic fluid container which is fillable using a braking fluid via a filling connecting piece 42, for example, may be connected to brake master cylinder 9. Brake fluid reservoir 41 is connected to brake master cylinder 9 in such a way that a brake fluid is exchangeable between brake master cylinder 9 and brake fluid reservoir 41.

From the front axle attachment of brake master cylinder 9, a first supply line 43 leads to a changeover valve 10 of first brake circuit 1. A bypass line having a check valve 44 is situated parallel to changeover valve 10. In the event of a malfunction of changeover valve 10, which would otherwise interrupt the hydraulic connection between brake master cylinder 9 and the wheel brake cylinders (not shown) of the brake calipers of front wheels 3 and 4, check valve 44 ensures the hydraulic connection continues to exist between brake master cylinder 9 and the wheel brake cylinders of the brake calipers. Correspondingly, the brake calipers of front wheels 3 and 4 may also be activated using brake pedal 8 during a failure of changeover valve 10. Because the function of changeover valve 10 has already been described above, it will not be discussed in greater detail here.

An intake valve 18 is also connected to first supply line 43 via a branching point 45. Furthermore, a pressure sensor 46 is connected to supply line 43 so that a pressure of the brake fluid which prevails in first brake circuit 1 is ascertainable using pressure sensor 46.

A line 47, which connects changeover valve 10 to a pressure buildup valve 11, runs from the side of changeover valve 10 facing away from first supply line 43. Pressure buildup valve 11 is associated with the wheel brake cylinder of the brake calipers of front wheel 4. A pressure buildup valve 12, which is associated with the wheel brake cylinder of the brake calipers of front wheel 3, is also connected to line 47 via a branching point 48. A bypass line having a check valve 49 or 50 is also situated parallel to each of pressure buildup valves 11 and 12.

Furthermore, a delivery side of a pump 15 is connected via a branching point 51 to line 47. In a specific embodiment, pump 15 is a single-piston pump. However, a pump having multiple pistons, an asymmetrical pump, or a gearwheel pump may also be used for pump 15. The braking device is thus not restricted to a two-piston ESP system.

A line 52, in which a spring-loaded check valve 17 is used, runs from the intake side of pump 15. Intake valve 18 is connected to line 52 via a branching point 53. A further branching point 54 connects line 52 to a hydraulic accumulator 16 for receiving a brake fluid. Line 52 ends at a pressure reduction valve 14, which is associated with the wheel brake cylinder of the brake caliper of front wheel 3. A pressure reduction valve 13, which is associated with the wheel brake cylinder of the brake caliper of front wheel 4, is also connected to line 52 via a branching point 55.

Pressure reduction valves 13 and 14 are each connected via a branching point 56 and 57 to lines 58 or 59, which each connect one of pressure buildup valves 11 or 12 to the associated wheel brake cylinder of the brake calipers of front wheels 3 and 4.

Valves 10, 11, 12, 13, 14, and 18 of first brake circuit 1 may be implemented as hydraulic valves. Changeover valve 10 and pressure buildup valves 11 and 12 may be implemented as normally open valves. It may correspondingly be preferable if pressure reduction valves 13 and 14 and intake valve 18 are implemented as normally closed valves. This ensures that a pressure buildup requested by the driver via the operation of brake pedal 8 is executed in the wheel brake cylinders of the brake calipers of front wheels 3 and 4. The driver brakes directly in first brake circuit 1. A further advantage of described first brake circuit 1 is that the pressure built up in the wheel brake cylinders of front wheels 3 and 4 may be reduced again rapidly. Reference is made to the above statements for the further description of a buildup or reduction of the brake pressure in the wheel brake cylinders of first brake circuit 1.

A second supply line 60 runs from a rear axle connection of brake master cylinder 9 to a disconnection valve 19 of second brake circuit 2. A line 61 runs from an output of disconnection valve 19 to a changeover valve 10a of second brake circuit 2 having a parallel bypass line having a check valve 44a. A line 63 is connected to line 61, which ends at an intake valve 18a of second brake circuit 2, via a branching point 62. A check valve 64 is situated in line 63 between branching point 62 and intake valve 18a. Check valve 64 blocks a flow of the brake fluid from branching point 67 to branching point 62.

Similarly to first brake circuit 1, changeover valve 10a of second brake circuit 2 is connected via a line 47a to a pressure buildup valve 12a and via a branching point 48a, which is situated in line 47a, to a pressure buildup valve 11a. Each of the two pressure buildup valves 11a and 12a is associated with a wheel brake cylinder (not shown) of a brake caliper of a rear wheel 5 or 6. Lines 58a and 59a, which connect pressure buildup valves 11a and 12a to one wheel brake cylinder of a brake caliper of a rear wheel 5 or 6 in each case, run from pressure buildup valves 11a and 12a. In addition, a bypass line having a check valve 49a or 50a runs parallel to each of pressure buildup valves 11a and 12a. A pressure reduction valve 13a or 14a is connected in each case to line 58a or 59a of cooperating pressure buildup valves 11a or 12a via branching points 56a and 57a.

Pressure reduction valves 13a and 14a are connected, via a branching point 55a, to a line 52a, which connects pressure reduction valves 13a and 14a to a pump 15a. Line 52a ends at the intake side of pump 15a. Line 52a has a spring-loaded check valve 17a. In addition, a hydraulic accumulator 16a is connected to line 52a via a branching point 54a, and intake valve 18a of second brake circuit 2 via a branching point 53a.

A line 65, which connects pump 15a to changeover valve 10a, runs from the delivery side of pump 15a. Line 65 ends at a branching point 51a on line 47a. A stepped piston assembly 33, which is used as an external accumulator, is also connected to line 65 and thus to pump 15a via a branching point 66.

Stepped piston assembly 33 has a differential piston, which includes an accumulator volume 34 on its primary side and a piston 35 on the secondary side. Storage volume 34 is connected via a branching point 67 to line 63, which connects disconnection valve 19 to intake valve 18a of second brake circuit 2. Accumulator volume 34 may have a significantly larger cross section than piston 35. The advantages of a similar implementation of the stepped piston assembly, for example, the advantageous friction of the differential piston, have already been described above.

The stepped piston assembly shown in FIG. 5 is only one possible example of an external accumulator, however, as is usable for executing the steps described here. Those skilled in the art may of course incorporate slight modifications into the external accumulator while maintaining the below-described function of stepped piston assembly 33. In addition, stepped piston assembly 33 may be equipped with an accumulator travel sensor and/or an accumulator travel switch. Other measuring sensors for indirectly detecting the storage content of stepped piston assembly 33 are also conceivable as an alternative.

Valves 10a, 11a, 12a, 13a, 14a, 18a, and 19a of second brake circuit 2 may be hydraulic valves. In a specific embodiment, changeover valve 10a and pressure buildup valves 11a and 12a are implemented as normally open valves and pressure reduction valves 13a and 14a and intake valve 18a are implemented as normally closed valves. Disconnection valve 19 may be a normally open valve. The cooperation of disconnection valve 19, check valve 64, and stepped piston assembly 33, which is used as the external accumulator, is discussed hereafter:

Second brake circuit 2 may be decoupled from brake master cylinder 9 using disconnection valve 19. Disconnection valve 19 may be implemented in such a way that in the case of open disconnection valve 19, operation of brake pedal 8 results in a pressure buildup in the wheel brake cylinders of rear wheels 5 and 6. However, if disconnection valve 19 is closed, the connection between brake master cylinder 9 and second brake circuit 2 is interrupted and second brake circuit 2 is decoupled from brake master cylinder 9. A direct engagement from brake master cylinder 9 through to the wheel brake cylinders of rear wheels 5 and 6 is no longer possible after second brake circuit 2 is decoupled from brake master cylinder 9. Therefore, after second brake circuit 2 is decoupled from brake master cylinder 9, the driver no longer brakes directly in second brake circuit 2 via an operation of brake pedal 8. The possibility thus exists when second brake circuit 2 is decoupled from brake master cylinder 9 of controlling the brake pressure applied to the wheel brake cylinders of rear wheels 5 and 6 externally and not as a direct function of an operation of brake pedal 8.

Stepped piston assembly 33 has a primary side, which provides a volume reservoir for the externally controlled active pressure buildup on the wheel brake cylinders of rear wheels 5 and 6. In addition, the primary circuit of second brake circuit 2 may be placed under pressure by a pressure buildup on the secondary side of stepped piston assembly 33, and pump 15a may be pre-loaded. Pre-loading of pump 15a is also ensured by check valve 64, which is situated between disconnection valve 19 and stepped piston assembly 33. Furthermore, check valve 64 ensures that the brake fluid flows back via a branching point 62 into stepped piston assembly 33 in the case of closed disconnection valve 19.

Stepped piston assembly 33 may have a volume design which allows secure filling of the wheel brake cylinder of the brake calipers of rear wheels 5 and 6. Elevated volume requirement by dynamic air gaps, fading, or similar effects may be taken into consideration. In an advantageous implementation of stepped piston assembly 33, there is a surface ratio between the primary side and the secondary side which is significantly greater than 1. The volume consumption for the pre-loading may be minimized in this manner.

Some of the brake applications executable using second brake circuit 2 are described hereafter. The executable brake applications are not restricted to the examples listed here, however.

Valves 10*a*, 11*a*, 12*a*, 13*a*, 14*a*, and 18*a* of a second brake circuit 2 are typically not energized in a driving situation in which the driver does not operate brake pedal 8 or another brake input element. Disconnection valve 19 is also open in this driving situation and the hydraulic connection is provided between brake master cylinder 9 and the wheel brake cylinders of the brake calipers of rear wheels 5 and 6.

However, if the driver operates brake pedal 8 or another brake input element, a current signal may be output via a controller (not shown) to normally open disconnection valve 19. This causes closing of disconnection valve 19 and thus decoupling of the brake calipers of rear wheels 5 and 6 from brake master cylinder 9. If this situation exists, the driver only still brakes directly in first brake circuit 1 via brake pedal 8 or via the other brake input element. The braking intent of the driver may be detected via a suitable sensor system (not described in greater detail here) and analyzed with respect to a desired total brake pressure. The brake pressure existing in first brake circuit 1 on front wheels 3 and 4 may be ascertained simultaneously. A difference between the desired total brake pressure and the brake pressure existing in first brake circuit 1 may subsequently be calculated.

A brake pressure corresponding to the calculated difference is then set actively on rear wheels 5 and 6. For this purpose, intake valve 18*a* of second brake circuit 2 is opened and changeover valve 10*a* is closed to set a differential pressure in second brake circuit 2. By activating pump 15*a*, a volume of a brake fluid is conveyed out of stepped piston assembly 33 into the wheel brake calipers of rear wheels 5 and 6. The brake fluid may be pumped into the wheel brake cylinders of the brake calipers of rear wheels 5 and 6 until the desired brake pressure is provided at rear wheels 5 and 6.

The method steps described here offer improved pedal feeling, because a total braking torque desired by the driver is maintained more precisely. In addition, a shorter pedal travel may be implemented via the method steps described here.

The method described in the preceding paragraphs may also be used for recuperative braking. In order to be able to perform recuperative braking having sufficient brake application by using an electric motor operated as a generator, a vehicle must have a certain minimum speed. Solely operating an electric motor operated as a generator is thus not sufficient to brake a traveling vehicle to a standstill. In order to allow a braking distance using a recuperative braking system which corresponds to that of a typical braking system, a conventional braking system should compensate for the missing brake application of the recuperative brake at lower speeds through a higher braking torque.

However, it is advantageous to achieve the highest possible degree of recuperation in established operating states of a vehicle. This may be implemented in that after shifting actions, the decoupled generator is overlaid again as a recuperative brake and the brake application is shifted in the direction of the recuperative brake again.

In addition, it is advantageous during activation of a recuperative brake to ensure that the recuperative brake is not available in the case of a full electrical power accumulator. In such a situation, the entire braking torque is therefore to be applied to wheels 3 through 6 via the friction brakes.

With the aid of the method described hereafter and the braking device of FIG. 5, it is possible to keep constant a total braking torque resulting from a hydraulic braking system and a recuperative brake. The effect of the hydraulic brake system is adapted to the effect of the recuperative brake. This may also be referred to as blending of the hydraulic brake system and the recuperative brake.

In the case of recuperative braking having simultaneously executed blending, a braking torque, which is not constant but is known, of the electric motor operated as a generator acts on rear wheels 5 and 6. Simultaneously, as described above, the total braking torque desired by the driver and the braking torque applied to front wheels 3 and 4 may be established. A computer may thus calculate the difference between the desired total braking torque and the sum of the recuperative braking torque and the braking torque applied to front wheels 3 and 4. By decoupling second brake circuit 2 from brake master cylinder 9 and activating pump 15, a hydraulic braking torque, which corresponds to the difference, may be set corresponding to the above-described action on rear wheels 5 and 6. For example, the hydraulic brake pressure may be set on rear wheels 5 and 6 by a pressure setting via a delta-p regulation of changeover valve 10*a*. As an alternative thereto, a pressure regulation of the hydraulic brake pressure using at least one pressure sensor, which is situated on rear wheels 5 and 6 and/or in second brake circuit 2, is also possible.

The method steps executed for blending do not require additional operation of brake pedal 8 by the driver. The driver does not have to take over the task of a deceleration regulator via stronger or weaker operation of brake pedal 8. In addition, the driver also does not directly perceive the blending and is thus not impaired in his driving comfort. Furthermore, the blending has hardly any influence on a braking distance of the vehicle.

With the help of similar method steps, it is additionally possible to set a brake force distribution as a function of transverse acceleration on the rear wheels during cornering. An ascertained transverse acceleration may be used as the input signal for allocating the vertical forces on the two rear wheels. This ensures more stable braking of a vehicle during cornering. In addition, more dynamic driving behavior may be achieved during dynamic braking while cornering by increasing the brake force on the wheel on the inside of the curve. Furthermore, the described method allows a greater brake force on the rear axle during reverse travel. The better brake force distribution thus achieved results in significantly more stable driving behavior above all during slow reverse travel uphill.

Highly dynamic braking may also be implemented using the braking device shown in FIG. 5. During highly dynamic braking, disconnection valve 19 may intentionally be kept open. A volume of the brake fluid is thus displaced from brake master cylinder 9, using the dynamics specified by the driver via the operation of brake pedal 8, into the wheel brake cylinders of the brake calipers of rear wheels 5 and 6. The pressure buildup dynamics on rear wheels 5 and 6 are no longer a function of pump 15*a* in this case. The braking dynamics are thus comparable to those of a conventional braking system.

The braking device also allows rapidly executable release of brakes. During the release of the brakes, intake valve 18 is closed and changeover valve 10*a* is opened in accordance with the decreasing braking intent. The brake fluid thus flows comparatively rapidly back into stepped piston assembly 33.

Furthermore, the braking device shown in FIG. 5 is manufacturable cost-effectively, in particular in comparison to a brake-by-wire braking system. The executed blending actions to achieve sufficient recuperation efficiency do not require costly auxiliary components of the braking device.

In an advantageous refinement, the braking device shown in FIG. 5 may be equipped with the additional components explained on the basis of FIG. 3 or 4. Because such an expansion of the braking device shown in FIG. 5 is easily understandable by those skilled in the art on the basis of the description of FIG. 3 or 4, it is not discussed in greater detail here. Reference is made to the above points in the text with respect to the advantages of such a refinement.

What is claimed is:

1. A braking device for a motor vehicle, comprising:
   a first group of brake circuits; and
   a second group of brake circuits;
   wherein one group of wheels is associated with each brake circuit, at least the first group of brake circuits being hydraulic brake circuits, at least one group of wheels being connected to at least one operating unit for causing a deceleration of the wheels, having a control unit, which controls the brake application of a brake circuit or circuits of the second group and the deceleration effect of the operating unit, and wherein the first group of brake circuits is activatable directly by the driver using a brake operating unit,
   wherein a brake circuit of the second group is a hydraulic brake circuit and is directly hydraulically connectable to the brake operating unit,
   wherein the hydraulic brake circuit of the second group has a hydraulic auxiliary accumulator on an intake side of a hydraulic pump of the hydraulic brake circuit in the form of a piston/cylinder system having a spring pre-tension which generates a suction effect,
   wherein the hydraulic auxiliary accumulator is not connected to the first group of brake circuits.

2. The braking device of claim 1, wherein the hydraulic brake circuit has one of a differential pressure regulator and a pressure regulator as the control element.

3. The braking device of claim 2, further comprising:
   an accumulator sensor for ascertaining the quantity of hydraulic fluid stored in the auxiliary accumulator.

4. The braking device of claim 1, wherein the piston/cylinder system has a stepped piston, whose secondary-side piston, which is smaller in cross section, is connected to a high-pressure line of the hydraulic brake circuit, reducing the accumulator volume.

5. The braking device of claim 1, wherein the brake circuits of both groups are hydraulic brake circuits and each having a hydraulic pump, wherein the hydraulic pumps are kinematically connected to a shared pump drive, and wherein the hydraulic pumps are associated with the brake circuits of the first group may be mechanically decoupled from the pump drive, by a freewheel clutch, which is controllable by a rotational direction of a pump drive shaft.

6. The braking device of claim 1, wherein the brake circuits of both groups are hydraulic brake circuits and each having a hydraulic pump, wherein the hydraulic pumps are kinematically connected to a shared pump drive, and wherein the hydraulic pumps associated with the brake circuits of the first group are connectable on the intake side to the particular high-pressure output via valves, and are connected to the particular brake circuit via spring-loaded check valves on the high-pressure side.

7. The braking device of claim 1, further comprising:
   a brake master cylinder, which is coupled to the brake operating unit so that during an operation of the brake operating unit, a pressure signal corresponding to the operation of the brake operating unit is provided, at least one brake circuit of the second group having at least one wheel brake cylinder, which is situated on an associated wheel, being coupled to the brake master cylinder so that the pressure signal from the brake master cylinder may be relayed to the wheel brake cylinder, the wheel brake cylinder being configured for the purpose of exerting a force corresponding to the pressure signal on the wheel;
   a disconnection valve, which is situated between the brake master cylinder and the wheel brake cylinder, and which is configured for passing into the closed state upon receiving a provided closing signal and preventing the pressure signal from being relayed to the wheel brake cylinder; and
   an external accumulator, which is coupled to the wheel brake cylinder so that the volume for a pressure buildup in the wheel brake cylinder may be provided by the external accumulator to the wheel brake cylinder.

8. The braking device of claim 7, wherein the external accumulator is a stepped piston, which has a volume reservoir for the elevated pressure in the wheel brake cylinder on a primary side and is coupled to a delivery side of a pump on a secondary side, the external accumulator and the pump being activatable by the control unit so that, if the disconnection valve is in its closed state, the pressure in the wheel brake cylinder is settable via the pump and the external accumulator.

9. The braking device of claim 1, wherein the first group of brake circuits are different from the second group of brake circuits.

10. A hydraulic system for a braking device of a motor vehicle, comprising:
    a first group of hydraulic brake circuits;
    a second group of hydraulic brake circuits, the brake circuits being hydraulically directly connected to a brake operating unit, which is operable directly by the driver, the brake circuits of the second group being connectable to the brake operating unit using a disconnection valve and being completely disconnectable therefrom, and having a control unit, which controls the brake application of a brake circuit or circuits of the second group;
    an accumulator unit, which is connected to the brake circuits of the second group,
    wherein the accumulator unit is on an intake side of a hydraulic pump of the brake circuit in the form of a piston/cylinder system having a spring pre-tension which generates a suction effect, and
    wherein the accumulator unit is not connected to the first group of hydraulic brake circuits.

11. The method of claim 10, wherein the first group of brake circuits are different from the second group of brake circuits.

12. A method for operating a braking device for a motor vehicle, comprising:
    activating directly brake circuits of a first group by a brake operating unit, while activating brake circuits of a second group by a control unit, which accepts a detected braking intent or a braking intent ascertained in another way, and which takes into account a deceleration effect of an operating unit and a brake application of the first group of brake circuits and the braking intent, and ascertains an intensity of operation of the second brake circuits therefrom;

wherein the braking device includes the first group of brake circuits, and further includes the second group of brake circuits, wherein one group of wheels is associated with each brake circuit, at least the first group of brake circuits being hydraulic brake circuits, at least one group of wheels being connected to the at least one operating unit for causing a deceleration of the wheels, having the control unit, which controls the brake application of the brake circuit or circuits of the second group and in particular the deceleration effect of the operating unit or assemblies, and the first group of brake circuits is activatable directly by the driver using the brake operating unit, wherein a brake circuit of the second group is a hydraulic brake circuit and is directly hydraulically connectable to the brake operating unit, wherein the hydraulic brake circuit of the second group has a hydraulic auxiliary accumulator on the intake side of a hydraulic pump of the brake circuit in the form of a piston/cylinder system having a spring pre-tension which generates a suction effect, and wherein the hydraulic auxiliary accumulator is not connected to the first group of brake circuits.

13. The method of claim 12, wherein the first group of brake circuits are different from the second group of brake circuits.

* * * * *